(12) United States Patent
Choi et al.

(10) Patent No.: US 9,073,049 B2
(45) Date of Patent: Jul. 7, 2015

(54) ADSORBENTS FOR THE RECOVERY OF CATALYST FROM BLOCK CO-POLYMER PROCESS AND METHOD FOR REGENERATING OF THE SAME

(75) Inventors: Jae Suk Choi, Daejeon (KR); Young Eun Cheon, Daejeon (KR); Tae Jin Kim, Daejeon (KR); Woo Sung Jung, Daejeon (KR); Seung Hoon Oh, Seoul (KR); Jang Jae Lee, Seongnam-si (KR); Dong Wook Kim, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 129 days.

(21) Appl. No.: 14/005,484

(22) PCT Filed: Mar. 29, 2012

(86) PCT No.: PCT/KR2012/002307
§ 371 (c)(1),
(2), (4) Date: Sep. 16, 2013

(87) PCT Pub. No.: WO2012/134186
PCT Pub. Date: Oct. 4, 2012

(65) Prior Publication Data
US 2014/0012026 A1    Jan. 9, 2014

(30) Foreign Application Priority Data

Mar. 29, 2011  (KR) .................. 10-2011-0028199

(51) Int. Cl.
| | | |
|---|---|---|
| *B01J 31/22* | (2006.01) | |
| *C08G 64/34* | (2006.01) | |
| *C08G 64/40* | (2006.01) | |
| *B01D 15/00* | (2006.01) | |
| *B01J 20/34* | (2006.01) | |
| *B01J 20/10* | (2006.01) | |

(52) U.S. Cl.
CPC ............. *B01J 31/2295* (2013.01); *C08G 64/34* (2013.01); *C08G 64/40* (2013.01); *B01D 15/00* (2013.01); *B01J 20/3433* (2013.01); *B01J 20/3475* (2013.01); *B01J 20/103* (2013.01)

(58) Field of Classification Search
CPC ...... B01J 31/22; B01J 31/2295; B01J 20/103; B01J 20/3433; B01J 20/3475; C08G 64/34; C08G 64/40; B01D 15/00
USPC .......................................................... 556/35
See application file for complete search history.

(56) References Cited

U.S. PATENT DOCUMENTS 6,133,402 A     10/2000  Coates et al.
8,715,388 B2 *  5/2014   Bai et al. .................... 75/710

FOREIGN PATENT DOCUMENTS

| JP | 11147002 A | 6/1999 |
|---|---|---|
| KR | 100811877 B1 | 3/2008 |
| KR | 100853358 B1 | 8/2008 |
| KR | 1020090090154 A | 8/2009 |
| KR | 1020100067593 A | 6/2010 |
| KR | 100981720 B1 | 9/2010 |

OTHER PUBLICATIONS

Shen et al., "Catalyst separation in atom transfer radical polymerization," Progress in Polymer Science, 2004, 1053-1078, vol. 29.

* cited by examiner

*Primary Examiner* — Porfirio Nazario Gonzalez
(74) *Attorney, Agent, or Firm* — The Webb Law Firm

(57) ABSTRACT

Provided is a process for isolating a catalyst from a solution having a copolymer and a catalyst dissolved therein, after performing copolymerization with the catalyst. More specifically the invention provides selection and application of an adsorbent to be used for the isolation.

7 Claims, 1 Drawing Sheet

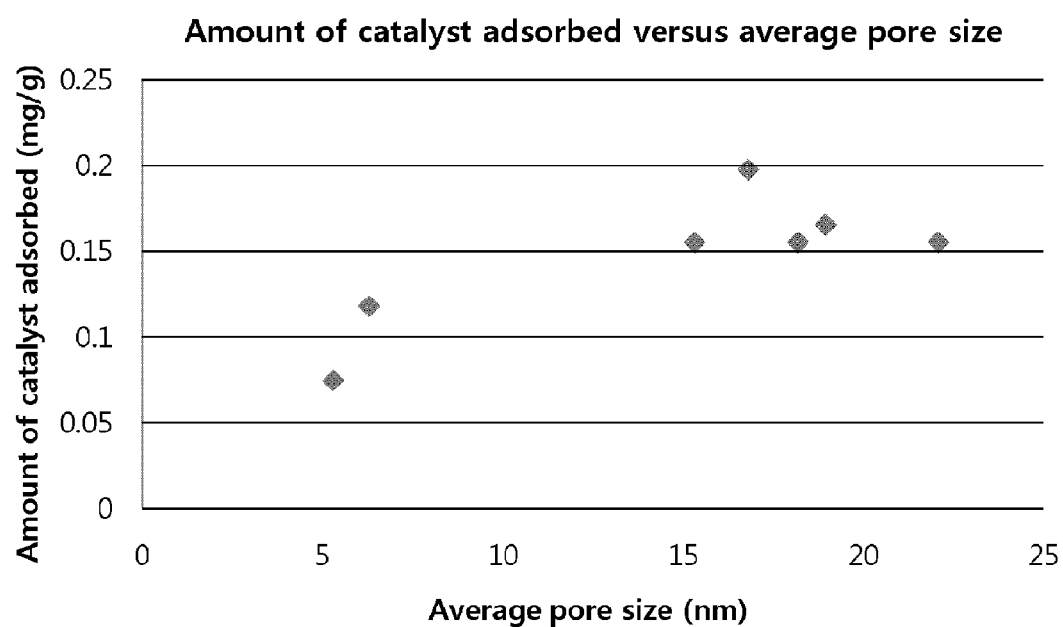

US 9,073,049 B2

ADSORBENTS FOR THE RECOVERY OF CATALYST FROM BLOCK CO-POLYMER PROCESS AND METHOD FOR REGENERATING OF THE SAME

CROSS-REFERENCE TO RELATED APPLICATIONS

This application is the United States national phase of International Application No. PCT/KR2012/002307 filed Mar. 29, 2012, and claims priority to Korean Patent Application No. 10-2011-0028199 filed Mar. 29, 2011, the disclosures of which are hereby incorporated in their entirety by reference.

TECHNICAL FIELD

The present invention relates a process for isolating a catalyst from a solution having a copolymer and a catalyst dissolved therein, after performing copolymerization by the use of the catalyst. More specifically, the invention provides selection and application of an adsorbent to be used for the isolation.

BACKGROUND ART

A process for preparing polycarbonate by copolymerizing epoxide and carbon dioxide with a complex containing onium salt as a catalyst, and a process for regenerating the catalyst by isolation and recovery of the same from the mixed solution of the product copolymer and the catalyst are disclosed by the present Applicant in Korean Patent Registration Nos. 10-0853358 and 10-0981270.

It is a rare case that a metal catalyst for polymerization is not isolated from the final product (as is the case for Ziegler-Natta catalyst). But the catalyst must be removed or recovered on the following reasons.

In a final stage for preparing polycarbonate through copolymerization of epoxide and carbon dioxide by using a complex containing onium salt as a catalyst, the catalyst is directly chemical-bonded with the copolymer chain at the terminal group of the long copolymer. As time goes by, while the catalyst is not isolated as such, the copolymer is degraded into carbon dioxide and cyclic propylene carbonate (CPC), thereby reducing molecular weight of the copolymer and deteriorating all physical properties accordingly, so that the product value of the copolymer is lowered.

If a ligand containing chromophore or a transition metal complex is not completely removed from the product, the final product may be colored to cause problems in product quality or product value. Further, applications of the copolymer might be restricted due to toxicity of the transition metal.

Since the catalyst for copolymerization of carbon dioxide/epoxide, the subject matter of the present invention, is comprised of expensive metal as well as plenty of high-price ligand, in particular, the used catalyst must be not only removed but recovered from the viewpoint of product economy.

In order to isolate or remove the catalyst used for polymerization, commonly utilized is alumina, silica gel, ion exchange resin, or the like (Prog. Polym. Sci. 2004, 29, 1053). More commonly used method is to remove the catalyst by direct interaction with functional groups such as —OH and —SH being present on the surface of an adsorbent. Silica or alumina, however, generally has low rate for catalyst removal, so that an excess amount should be used in order to remove the catalyst up to sufficient level. Thus, high material cost as well as the process cost (for solvent used, or for pressure loss) are required. It is necessary to consider economy of the subjective process by searching for an adsorbent with high efficiency for catalyst removal in a small amount, and a process for regenerating it.

DISCLOSURE OF INVENTION

Technical Problem

The object of the present invention is to provide a process for isolating or recovering the catalyst from a mixed solution of copolymer and catalyst, after copolymerization by the use of complex having onium salt as a catalyst, by means of an adsorbent of stationary phase having high efficiency; and a process for regenerating the adsorbent.

Solution to Problem

In order to achieve the object, the present invention provides a process for isolating or recovering the catalyst from a solution having copolymer and catalyst dissolved therein, by means of an adsorbent of stationary phase, and a process for regenerating the adsorbent used. More specifically, the invention relates to a process for recovering the catalyst from a solution having copolymer and catalyst dissolved therein by using silica as an adsorbent of stationary phase, having average pore size of 5-30 nm, pore volume of 0.75-3.3 $cm^3/g$ and production rate of propionaldehyde of not more than 0.0035%, and regenerating the silica, which comprises the steps of:

1) contacting a solution having copolymer and catalyst dissolved therein, which was formed after copolymerization of carbon dioxide and epoxide by using a complex containing onium salt as a catalyst, with silica that is not soluble in the solution to result in isolation of the catalyst by means of adsorption of the catalyst on the surface of silica; and 2) treating the silica with catalyst adsorbed thereon with acid to desorb the catalyst from the surface of silica and to regenerate silanol group of silica.

Contact of the solution having copolymer and catalyst dissolved therein with silica in step 1) implies that silica is added to the solution having copolymer and catalyst dissolved therein, and the mixture is filtered, or that the solution is passed through a column filled with silica.

Acid treatment of step 2) comprises washing the silica, which adsorbed the catalyst in step 1), with a mixed solution of organic or inorganic acid and polar solvent (0.01~10:90~99.99 by volume). The organic or inorganic acid is selected from a group consisting of nitric acid, hydrochloric acid, phosphoric acid, acetic acid and trifluoroacetic acid, and mixtures thereof. The polar solvent is selected from a group consisting of C1-C10 alcohols, ketones, furanes and nitriles, and mixtures thereof. Preferably used is a solvent selected from methanol, ethanol, tetrahydrofuran, acetonitrile, and mixtures thereof.

As to the process according to the invention for copolymerizing carbon dioxide and epoxide by using a complex containing onium salt as a catalyst, or the epoxides usable as the starting material, reaction condition, process condition, and the like, the process may be carried out according to the disclosures of Korean Patent Laid-Open No. 10-2009-0090154 and Korean Patent Registration No. 10-0853358. As the complex containing onium salt used as the catalyst, usable are those complexes disclosed by Korean Patent Laid-Open No. 10-2009-0090154, Korean Patent Registration No.

10-0853358 and Korean Patent Laid-Open No. 10-2010-0067593, or complexes represented by Chemical Formula (1):

[Chemical Formula 1]

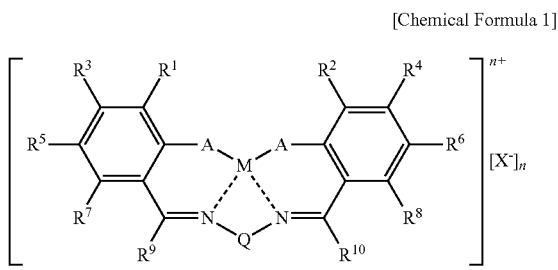

wherein,

M is trivalent cobalt or trivalent chromium;

A is an oxygen or sulfur atom;

Q is a diradical linking two nitrogen atoms;

$R^1$ through $R^{10}$ independently represent hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of Group 14 metal substituted with (C1-C20)alkyl or (C6-C20)aryl;

two of $R^1$ through $R^{10}$ may be linked to each other to form a ring;

at least one of hydrogens contained in $R^1$ through $R^{10}$ and Q may be substituted with a cationic group selected from a group consisting of those represented by Chemical Formula (a), (b) or (c):

[Chemical Formula a]

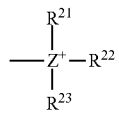

[Chemical Formula b]

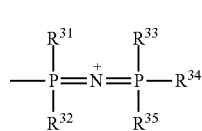

[Chemical Formula c]

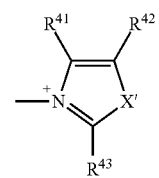

$X^-$ independently represents halogen anion; $HCO_3^-$; $BF_4^-$; $ClO_4^-$; $NO_3^-$; $PF_6^-$; (C6-C20)aryloxy anion; (C6-C20)aryloxy anion containing one or more atoms selected from halogen atom, nitrogen atom, oxygen atom, silicon atom, sulfur atom and phosphorus atom; (C1-C20)alkylcarboxy anion; (C1-C20)alkylcarboxy anion containing one or more atoms selected from halogen atom, nitrogen atom, oxygen atom, silicon atom, sulfur atom and phosphorus atom; (C6-C20)arylcarboxy anion; (C6-C20)arylcarboxy anion containing one or more atoms selected from halogen atom, nitrogen atom, oxygen atom, silicon atom, sulfur atom and phosphorus atom; (C1-C20)alkoxy anion; (C1-C20)alkoxy anion containing one or more atoms selected from halogen atom, nitrogen atom, oxygen atom, silicon atom, sulfur atom and phosphorus atom; (C1-C20)alkylcarbonate anion; (C1-C20)alkylcarbonate anion containing one or more atoms selected from halogen atom, nitrogen atom, oxygen atom, silicon atom, sulfur atom and phosphorus atom; (C6-C20)arylcarbonate anion; (C6-C20)arylcarbonate anion containing one or more atoms selected from halogen atom, nitrogen atom, oxygen atom, silicon atom, sulfur atom and phosphorus atom; (C1-C20)alkylsulfonate anion; (C1-C20)alkylsulfonate anion containing one or more atoms selected from halogen atom, nitrogen atom, oxygen atom, silicon atom, sulfur atom and phosphorus atom; (C1-C20)alkylamido anion; (C1-C20)alkylamido anion containing one or more atoms selected from halogen atom, nitrogen atom, oxygen atom, silicon atom, sulfur atom and phosphorus atom; (C6-C20)arylamido anion; (C6-C20)arylamido anion containing one or more atoms selected from halogen atom, nitrogen atom, oxygen atom, silicon atom, sulfur atom and phosphorus atom; (C1-C20)alkylcarbamate anion; (C1-C20)alkylcarbamate anion containing one or more atoms selected from halogen atom, nitrogen atom, oxygen atom, silicon atom, sulfur atom and phosphorus atom; (C6-C20)arylcarbamate anion; or (C6-C20)arylcarbamate anion containing one or more atoms selected from halogen atom, nitrogen atom, oxygen atom, silicon atom, sulfur atom and phosphorus atom;

Z represents a nitrogen or a phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of Group 14 metal substituted with (C1-C20)alkyl or (C6-C20)aryl; or two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of Group 14 metal substituted with (C1-C20)alkyl or (C6-C20)aryl; or two of $R^{41}$, $R^{42}$ and $R^{43}$ may be linked to each other to form a ring;

X' is an oxygen atom, a sulfur atom or N—R (wherein R is (C1-C20)alkyl);

n is an integer obtained by adding 1 to the total number of cationic groups contained in $R^1$ through $R^{10}$ and Q;

$X^-$ may be coordinated to M; and a nitrogen atom of imine may be coordinated to or deco-ordinated from M.

When performing copolymerization of epoxide and carbon dioxide by using the complex as a catalyst, an anion of the onium salt nucleophilically attacks the epoxide activated via coordination to the core metal having a Lewis acid group to initiate the reaction this polymerization mechanism is generally accepted. An alkoxy anion formed from nucleophilic attack reacts with carbon dioxide to produce carbonate anion, which again nucleophilically attacks to the activated epoxide via coordination to the core metal. These reactions are repeated to form a polymer chain. After such polymerization reactions, all or a proportion of those anions of onium salt contained in the catalyst are converted to carbonate anions or alkoxide anions containing polymer chains.

"The solution having copolymer and catalyst dissolved therein" according to the present invention may be a solution obtained after copolymerization of epoxide and carbon dioxide using a catalyst, as described in Korean Patent Laid-Open No. 10-2009-0090154, but before removing unreacted carbon dioxide or epoxide, the same solution after removing only carbon dioxide, or the solution after removing both carbon dioxide and epoxide and adding some other solvent for work-up.

When "the solution having copolymer and catalyst dissolved therein" is contacted with a substance having "a functional group which can undergo deprotonation by an alkoxy anion", "the functional group which can undergo deprotonation" reacts through an acid-base reaction, with the alkoxide anion containing a polymer chain being present as an anion of the onium salt. Thus the polymer chain gains a proton to be neutralized and dissolved in the solution, while the catalyst containing onium salt is isolated from the polymer chain. Representative examples of "functional groups which can undergo deprotonation by an alkoxy anion" include sulfonic acid group, carboxylic acid group, phenol group, alcohol group. Among inorganic substances, the groups may be hydroxyl groups on alumina or silica surface.

During the neutralization of the polymer chain, the deprotonated functional group may be present as an anion, thereby strongly interacting with the transition metal or the cationic functional group (e.g., tertiary or quaternary ammonium group) of the catalyst containing onium salt to result in adsorption of the isolated catalyst. Alternatively, the proton being present at the terminal of hydroxyl group might form a partial hydrogen bond with said transition metal or with the cation functional group to cause adsorption.

When using an acidic solid such as zeolite or alumina, whose proton can be easily isolated, in order to promote deprotonation, or to facilitate hydrogen bonding in a stationary phase, epoxide as the solvent might initiate an acid-catalyzed ring opening reaction to result in sudden increase of byproducts, thereby requiring high cost for isolation/purification, even though the isolation and adsorption capacity of the catalyst and polymer could be improved to some extent. Thus, the stationary phase adsorbent for isolating catalyst, which is usable according to the present invention, preferably is solid silica, having enough hydroxyl terminal groups on the surface but being hardly acidic. Hydroxyl groups bonded to silicon on the surface are particularly referred to as silanol groups. The hydroxyl groups as effective adsorbent hereinafter imply silanol groups.

The silica for efficient catalyst removal from "the solution having copolymer and catalyst dissolved therein" according to the present invention must have pores at the least in order to provide sufficient mass transfer of the catalyst containing onium salt, which had been isolated from the copolymer. Preferably, silica has average pore size of not less than 5 nm, more preferably from 5 to 30 nm.

For easy diffusion of said solution, having high viscosity owing to high molecular weight, into silica pore, silica with large pore volume is advantageously used. The pore volume preferably is from 0.75 to 3.3 cm$^3$/g, more preferably from 2.8 to 3.3 cm$^3$/g.

As the catalyst is removed from the solution in accordance with the invention, the adsorption capacity of silica to carry out adsorption is reduced. When the amount of adsorption exceeds a certain degree, silica is saturated with the catalyst, showing no more adsorption. When the saturated silica with catalyst is treated with acid to desorb the catalyst, silanol group on the silica is regenerated to be reused as adsorbent. It is believed that desorption of catalyst via acid treatment is carried out as ionic bonds or partial hydrogen bonds between the catalyst and silanol groups are weakened by an excess amount of protons, and an excess amount of polar solvent readily solvates the catalyst.

In order to reuse the catalyst, for the purpose of recovery of catalyst precursor, which was completely or partially dissociated from the silica, treatment with a variety of mixed fluid before the regenerating stage of silica may be carried out. Even though most of the catalyst is isolated and removed via said stage, the stage of acid treatment is still effective in order to wash other organic residues or solvent away and to regenerate adsorption capacity of silica.

During the process of acid treatment of silica for desorption of adsorbed catalyst and regeneration of silica, or of introducing a special process to prepare silica having large pore volume, acid intensity of the silica surface may increase. It is attributed to strong adsorption of the acid added, or to the impurities such as sodium and calcium, which had been introduced during the preparation process. Acid property of the adsorbent induces oxidation of propylene oxide (one of the main reactants) to produce propionaldehyde which may function as catalyst poison. Accordingly, selected silica should be minimized oxidation. With a very small amount of acid, that cannot be measured via general method to determine an amount or intensity of solid acid (ammonia adsorption or pyridine adsorption), the activity of copolymerization is considerably lowered. Thus, the suitable silica for the present invention should be selected via evaluation of stability, such as a method of contacting with propylene oxide. Preferably, silica has production rate of propionaldehyde [PO stability index or PA production amount] of not more than 0.0035%.

Advantageous Effects of Invention

According to the process of the present invention, an excess amount of catalyst can be isolated from a solution having copolymer and catalyst dissolved therein by adsorption with silica as catalyst adsorbent, the silica having average pore size of not less than 5 nm, pore volume of 0.75 to 3.3 cm$^3$/g and production rate of propionaldehyde of not more than 0.0035%. Furthermore, silanol groups of the silica can be regenerated by desorption of the adsorbed catalyst via simple washing with an acid solution, so that the silica may be reused repeatedly as adsorbent. Thus, the production cost for copolymer can be lowered, while providing enhanced product performances to the copolymer produced.

BRIEF DESCRIPTION OF DRAWINGS

The above and other objects, features and advantages of the present invention will become apparent from the following description of preferred embodiments given in conjunction with the accompanying drawings, in which:

FIG. 1 shows the comparison of the amount of catalyst adsorbed versus average pore size in Example 1.

MODE FOR THE INVENTION

Now the present invention is more specifically described with respect to the examples. The Examples are described to illustrate the present invention, without restricting the scope of the present invention.

Example 1 and Comparative Examples 1-2

Evaluation of the Amount of Catalyst Adsorption Versus Pore Volume and Pore Size By using two types of silica having the pore volume of not more than 0.75 cm$^3$/g, confirmed was efficiency of catalyst removal from the solution having the catalyst dissolved therein. A complex (347 mg) containing onium salt (represented by the following chemical formula), used as a catalyst for copolymerization of epoxide and carbon dioxide dissolved in propylene oxide (10 mL). Then different kinds of silica (3.0 g) listed in Table 1 were individually immersed. It was kept at ambient temperature for 3 hours to perform adsorption of the catalyst on the silica surface. The less the pore volume was, the less the amount of catalyst adsorbed substantially was.

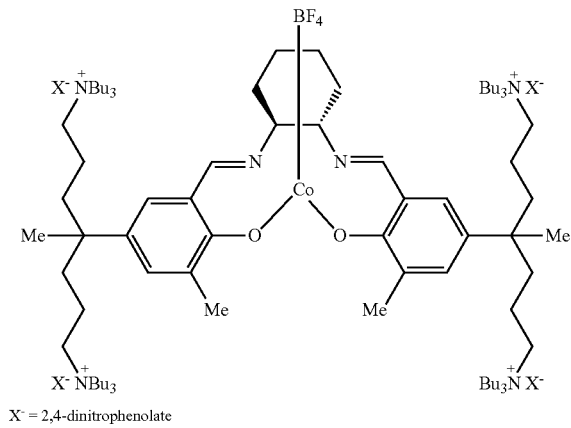

$X^-$ = 2,4-dinitrophenolate

TABLE 1

Comparison of the amount of catalyst adsorbed versus pore volume

| | Silica | | |
|---|---|---|---|
| | A | Comparative-1 | Comparative-2 |
| Pore volume (cm$^3$/g) | 0.75 | 0.52 | 0.66 |
| Amount of catalyst adsorbed (mg/g) | 0.1185 | 0.0733 | 0.1052 |

Further, the results of comparison the amount of catalyst adsorbed versus average pore size are shown in Table 2 and FIG. 1. As the average pore size increased to 5 nm or more, the amount of catalyst adsorbed also increased.

TABLE 2

Comparison of the amount of catalyst adsorbed versus average pore size

| | A | B | C | D | E | F | G |
|---|---|---|---|---|---|---|---|
| Average pore size (nm) | 6.273 | 5.277 | 15.304 | 16.787 | 18.162 | 18.936 | 22.065 |
| Amount of catalyst adsorbed (mg/g) | 0.1185 | 0.075 | 0.1557 | 0.198 | 0.1556 | 0.1658 | 0.1558 |

Example 2

Evaluation of Catalyst Adsorption Capacity by Different Silicas (1)

The catalyst (339 mg) used in Example 1 was dissolved in propylene oxide (50 mL). Different types of silica (3.0 g) as shown in Table 3 were individually immersed in the solution, and the resultant mixture was kept at ambient temperature for 3 hours to give adsorption of the catalyst on the surface of silica. The excess catalyst, which is not adsorbed in silica, remained in the solvent. After removing the silica with catalyst adsorbed thereon, yellowness index (YI) of the filtrate was measured to evaluate adsorption capacity of individual silica. Before introducing silica, YI of the solution containing the catalyst and propylene oxide was 184.4.

As can be seen from Table 3, the lower YI exhibits the higher catalyst adsorption, and the larger the pore volume of silica gives the more advantageous catalyst adsorption.

TABLE 3

| | Silica | | | | |
|---|---|---|---|---|---|
| | A | H | I | J | Before addition |
| YI | 62.75 | 11.71 | 10.57 | 21.85 | 184.4 |
| BET surface area (m$^2$/g) | 479 | 395 | 678 | 280 | — |
| Pore volume (cm$^3$/g) | 0.75 | 3.16 | 3.23 | 1.62 | — |

Example 3

Evaluation of Catalyst Adsorption Capacity by Different Silicas (2)

The catalyst (2.435 g) used in Example 1 was dissolved in propylene oxide (50 mL). Different types of silica (3.0 g) as shown in Table 4 were individually immersed in 10 mL of the solution over 3 hours. After complete adsorption, the sample was dried in vacuo to remove the solvent. The amount of catalyst adsorbed was then determined by means of thermogravimetry. Since the catalyst contains about 97% of organic substances on the basis of the molecular weight, and the component ratio is constant, the amount of catalyst adsorbed can be calculated on the basis of the weight decrease by combustion. The results are shown in Table 4. The maximum amount of catalyst adsorption determined by means of the above method increased with the pore volume.

TABLE 4

| Silica | Maximum amount of adsorption (wt %) | Pore volume ($cm^3/g$) |
|---|---|---|
| A | 11.85 | 0.75 |
| K | 15.58 | 2.52 |
| L | 16.58 | 2.80 |

Example 4

Evaluation of Catalyst Removal Capacity by Silica

To a "solution containing copolymer and catalyst dissolved therein" (100 g, polymer content: 15 wt %), which had been prepared by copolymerization of carbon dioxide and epoxide (according to the description of Korean Laid-Open No. 2009-0090154) in the presence of the catalyst used in Example 1 above, individually added were different types of silica (20 g) listed in Table 5. The mixture was mixed for 1 hour to isolate the catalyst from the copolymer and to adsorb the catalyst on the silica surface. Then the solid phase was isolated by using a centrifuge, and YI of the liquid phase was measured to compare the rate of catalyst removal. Before adding silica, YI of the solution containing copolymer and catalyst dissolved therein was 63.9. On the basis of YI values in Table 5, it is found that most of catalyst having chromophore was removed by adsorption, and the larger the pore volume was, the larger amount of catalyst was removed by adsorption (decrease of YI in the filtrate).

TABLE 5

| Silica | YI (1 hr) | Pore volume ($cm^3/g$) |
|---|---|---|
| Before addition | 63.9 | — |
| A | 10.5 | 0.75 |
| I | 8.0 | 3.23 |
| K | 9.1 | 2.52 |

Example 5

Regeneration of Silica Having Catalyst Adsorbed

To a solution of the catalyst (10.69 g) according to Example 1 dissolved in propylene oxide (200 mL), added was silica A (60 g)(pore volume: 0.75 $cm^3/g$). After adsorption to saturation over 16 hours, the mixture was repeatedly washed 10 times with each 200 mL of 1% nitric acid/ethanol solution. Silica before and after desorption was analyzed by ICP, to determine the amount of catalyst adsorbed and desorbed. The results are shown in Table 6. As the number of regeneration increased, catalyst was adsorbed without decrease of the amount of catalyst adsorption. Each time, the experiment showed at least 96% of catalyst removal. Further, it is found that at least 5 times of catalyst removal by using acid treatment and regeneration of silica can be performed. In addition, it is found that the process did not cause physical deformation of silica, since there was no change in BET surface area and pore volume of silica before and after adsorption/desorption of the catalyst.

TABLE 6

Experimental results of regeneration of silica

| No. of regeneration | Co content adsorbed (ppm)[a] | Co content[a] remained in silica gel after desorption (ppm) | Co removal (%) | BET surface area($m^2/g$) | Pore volume ($cm^3/g$) |
|---|---|---|---|---|---|
| 1 | 3461 | 135.5 | 96.1 | 490 | 0.75 |
| 2 | 4034 | 81.6 | 98.0 | 474 | 0.73 |
| 3 | 3354 | 55.6 | 98.3 | 493 | 0.77 |
| 4 | 3834 | 101.0 | 97.4 | 492 | 0.76 |
| 5 | 4121 | 157.4 | 96.2 | 483 | 0.76 |

[a]Co content was obtained by ICP analysis.

Example 6

Evaluation of Stability of Silica in Propylene Oxide

To each different type of silica (1.5 g) listed in Table 7, added was propylene oxide (9.0 g), and the mixture was stood over 24 hours. Content of the product was analyzed by gas chromatography. The content of propylene oxide before reaction (without contacting silica) was 99.988%. After contacting with silica over 24 hours, content of propylene oxide and that of propionaldehyde (that may function as catalyst poison) were shown in Table 7. The amount of produced propionaldehyde differed depending upon type of silica, in particular, acid intensity of the surface. Existence of silica having large pore size and high stability in propylene oxide was confirmed.

TABLE 7

| Silica | Propylene oxide | Propionaldehyde |
|---|---|---|
| A | 99.7438% | 0.0006% |
| I | 99.8855% | 0.0034% |
| K | 99.9235% | 0.0027% |
| L | 99.8936% | 0.0008% |

INDUSTRIAL APPLICABILITY

According to the process of the present invention, an excess amount of catalyst can be isolated from a solution having copolymer and catalyst dissolved therein by adsorption with silica as catalyst adsorbent, the silica having average pore size of not less than 5 nm, pore volume of 0.75 to 3.3 $cm^3/g$ and production rate of propionaldehyde of not more than 0.0035%. Furthermore, silanol groups of the silica can be regenerated by desorption of the adsorbed catalyst via simple washing with an acid solution, so that the silica may be reused repeatedly as adsorbent. Thus, the production cost for copolymer can be lowered, while providing enhanced product performances to the copolymer produced.

The invention claimed is:
1. A process for recovering the catalyst from a solution of copolymer and catalyst dissolved therein by using silica having average pore size of not less than 5 nm, pore volume of

0.75-3.3 cm³/g and production rate of propionaldehyde not more than 0.0035%, and regenerating the silica, which comprises the steps of:
  1) contacting a solution having copolymer and catalyst dissolved therein, which was formed after copolymerization of carbon dioxide and epoxide by using a complex containing onium salt as a catalyst, with silica that is not soluble in the solution to result in isolation of the catalyst by means of adsorption of the catalyst on the surface of silica; and
  2) treating the silica with catalyst adsorbed thereon with acid to desorb the catalyst from the surface of silica and to regenerate silanol group of silica.

2. The process in accordance with claim 1, wherein contact of the solution having copolymer and catalyst dissolved therein with silica in step 1) implies that silica is added to the solution having copolymer and catalyst dissolved therein and the mixture is filtered, or that the solution is passed through a column filled with silica.

3. The process in accordance with claim 1, wherein the acid treatment of step 2) employs a mixed solution of organic or inorganic acid and polar solvent in a volume ratio of 0.01~10: 90~99.99.

4. The process in accordance with claim 3, wherein the organic or inorganic acid is one or a mixture of two or more selected from a group consisting of nitric acid, hydrochloric acid, phosphoric acid, acetic acid and trifluoroacetic acid.

5. The process in accordance with claim 3, wherein the polar solvent is one or a mixture of two or more selected from a group consisting of C1-C10 alcohols, ketones, furanes and nitriles.

6. The process in accordance with claim 5, wherein the polar solvent is one or a mixture of two or more selected from a group consisting of methanol, ethanol, tetrahydrofuran and acetonitrile.

7. The process in accordance with claim 1, wherein the complex containing onium salt as a catalyst for step 1) is represented by Chemical Formula (1):

[Chemical Formula 1]

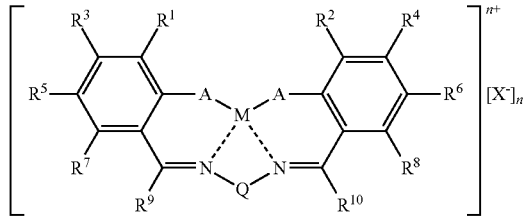

wherein,

M is trivalent cobalt or trivalent chromium;

A is an oxygen or sulfur atom;

Q is a diradical linking two nitrogen atoms;

$R^1$ through $R^{10}$ independently represent hydrogen; halogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; (C1-C20)alkoxy; (C6-C30)aryloxy; formyl; (C1-C20)alkylcarbonyl; (C6-C20)arylcarbonyl; or a metalloid radical of Group 14 metal substituted with (C1-C20)alkyl or (C6-C20) aryl;

two of $R^1$ through $R^{10}$ may be linked to each other to form a ring;

at least one of hydrogens contained in $R^1$ through $R^{10}$ and Q may be substituted with a cationic group selected from a group consisting of those represented by Chemical Formula (a), (b) or (c):

[Chemical Formula a]

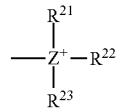

[Chemical Formula b]

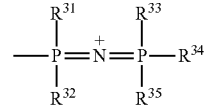

[Chemical Formula c]

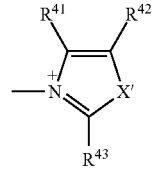

$X^-$ independently represents halogen anion; $HCO_3^-$; $BF_4^-$; $ClO_4^-$; $NO_3^-$; $PF_6^-$; (C6-C20)aryloxy anion; (C6-C20) aryloxy anion containing one or more atoms selected from halogen atom, nitrogen atom, oxygen atom, silicon atom, sulfur atom and phosphorus atom; (C1-C20)alkylcarboxy anion; (C1-C20)alkylcarboxy anion containing one or more atoms selected from halogen atom, nitrogen atom, oxygen atom, silicon atom, sulfur atom and phosphorus atom; (C6-C20)arylcarboxy anion; (C6-C20)arylcarboxy anion containing one or more atoms selected from halogen atom, nitrogen atom, oxygen atom, silicon atom, sulfur atom and phosphorus atom; (C1-C20)alkoxy anion; (C1-C20)alkoxy anion containing one or more atoms selected from halogen atom, nitrogen atom, oxygen atom, silicon atom, sulfur atom and phosphorus atom; (C1-C20)alkylcarbonate anion; (C1-C20)alkylcarbonate anion containing one or more atoms selected from halogen atom, nitrogen atom, oxygen atom, silicon atom, sulfur atom and phosphorus atom; (C6-C20)arylcarbonate anion; (C6-C20)arylcarbonate anion containing one or more atoms selected from halogen atom, nitrogen atom, oxygen atom, silicon atom, sulfur atom and phosphorus atom; (C1-C20)alkylsulfonate anion; (C1-C20)alkylsulfonate anion containing one or more atoms selected from halogen atom, nitrogen atom, oxygen atom, silicon atom, sulfur atom and phosphorus atom; (C1-C20)alkylamido anion; (C1-C20)alkylamido anion containing one or more atoms selected from halogen atom, nitrogen atom, oxygen atom, silicon atom, sulfur atom and phosphorus atom; (C6-C20)arylamido anion; (C6-C20)arylamido anion containing one or more atoms selected from halogen atom, nitrogen atom, oxygen atom, silicon atom, sulfur atom and phosphorus atom; (C1-C20)alkylcarbamate anion; (C1-C20)alkylcarbamate anion containing one or more atoms selected from halogen atom, nitrogen atom, oxygen atom, silicon atom, sulfur atom and phosphorus atom; (C6-C20)arylcarbamate anion; or (C6-C20)arylcarbamate anion containing one or more atoms selected from halogen atom, nitrogen atom, oxygen atom, silicon atom, sulfur atom and phosphorus atom;

Z represents a nitrogen or a phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of Group 14 metal substituted with (C1-C20)alkyl or (C6-C20)aryl; or two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl containing one or more atoms selected from halogen atom, nitrogen atom, oxygen atom, silicon atom, sulfur atom and phosphorus atom; (C2-C20)alkenyl; (C2-C20)alkenyl containing one or more atoms selected from halogen atom, nitrogen atom, oxygen atom, silicon atom, sulfur atom and phosphorus atom; (C1-C20)alkyl(C6-C20)aryl; (C1-C20)alkyl(C6-C20)aryl containing one or more atoms selected from halogen atom, nitrogen atom, oxygen atom, silicon atom, sulfur atom and phosphorus atom; (C6-C20)aryl(C1-C20)alkyl; (C6-C20)aryl(C1-C20)alkyl containing one or more atoms selected from halogen atom, nitrogen atom, oxygen atom, silicon atom, sulfur atom and phosphorus atom; or a metalloid radical of Group 14 metal substituted with (C1-C20)alkyl or (C6-C20)aryl; or two of $R^{41}$, $R^{42}$ and $R^{43}$ may be linked to each other to form a ring;

X' is an oxygen atom, a sulfur atom or N—R (wherein R is (C1-C20)alkyl);

n is an integer obtained by adding 1 to the total number of cationic groups contained in $R^1$ through $R^{10}$ and Q;

$X^-$ may be coordinated to M; and a nitrogen atom of imine may be coordinated to or decoordinated from M.

\* \* \* \* \*